(12) United States Patent
Armstrong et al.

(10) Patent No.: US 7,705,240 B2
(45) Date of Patent: Apr. 27, 2010

(54) CORD SEAL FOR SWIMMING POOL AND SPA LIGHT NICHES

(75) Inventors: Daniel A. Armstrong, Simi Valley, CA (US); Louis Teran, Granada Hills, CA (US)

(73) Assignee: Pentair Water Pool and Spa, Inc., Sanford, NC (US)

( * ) Notice: Subject to any disclaimer, the term of this patent is extended or adjusted under 35 U.S.C. 154(b) by 229 days.

(21) Appl. No.: 11/544,335

(22) Filed: Oct. 6, 2006

(65) Prior Publication Data

US 2007/0097667 A1    May 3, 2007

Related U.S. Application Data

(60) Provisional application No. 60/730,636, filed on Oct. 27, 2005.

(51) Int. Cl.
  *H02G 15/02*  (2006.01)
(52) U.S. Cl. .................................. 174/74 R; 174/77 R
(58) Field of Classification Search ............... 174/74 R, 174/77 R, 84 R, 92, 93
  See application file for complete search history.

(56) References Cited

U.S. PATENT DOCUMENTS

| | | | |
|---|---|---|---|
| 4,433,366 A | 2/1984 | Wade | |
| 4,460,944 A | 7/1984 | Gordbegli et al. | |
| 4,539,629 A | 9/1985 | Poppenheimer | |
| 4,556,933 A | 12/1985 | Mendoza | |
| 4,574,337 A | 3/1986 | Poppenheimer | |
| 4,622,436 A * | 11/1986 | Kinnan | 174/77 R |
| 4,656,689 A * | 4/1987 | Dennis | 16/2.2 |
| 4,895,533 A * | 1/1990 | Yagi et al. | 439/587 |
| 5,051,875 A | 9/1991 | Johnson | |
| 5,147,980 A | 9/1992 | Ferguson, Jr. | |
| 5,207,499 A | 5/1993 | Vajda et al. | |
| 5,412,549 A | 5/1995 | Blakely | |
| 5,432,688 A | 7/1995 | Tobias et al. | |
| 5,483,428 A | 1/1996 | Poppenheimer | |
| 5,545,952 A | 8/1996 | Mortensen | |
| 5,607,224 A | 3/1997 | Tobias et al. | |
| 5,800,041 A | 9/1998 | Poggi | |
| 5,842,771 A | 12/1998 | Thrasher et al. | |
| 6,174,067 B1 | 1/2001 | Thrasher et al. | |
| 6,241,361 B1 | 6/2001 | Thrasher et al. | |
| 6,250,776 B1 | 6/2001 | Burkitt et al. | |

(Continued)

FOREIGN PATENT DOCUMENTS

EP    0 580 130    1/1994

(Continued)

*Primary Examiner*—William H Mayo, III
(74) *Attorney, Agent, or Firm*—Greenberg Traurig, LLP

(57) ABSTRACT

A cord seal for use in an underwater niche including a main seal and a seal cap. The main seal includes a one-piece member with passages that are accessible from one side of the main seal and an opposite side of the main seal. The main seal includes at least a first split. The seal cap is placed in physical contact with the opposite side of the main seal. The first split spans from the one side of the main seal to the opposite side and the first split begins at an edge of one of the passages and ends at an outer circumferential edge of the main seal.

24 Claims, 3 Drawing Sheets

U.S. PATENT DOCUMENTS

| | | | |
|---|---|---|---|
| 6,798,154 B1 | 9/2004 | Sullivan et al. | |
| 6,811,286 B2 | 11/2004 | Mateescu et al. | |
| 6,949,894 B1 | 9/2005 | Sullivan et al. | |
| 7,114,727 B1 * | 10/2006 | Goll | 277/616 |
| 2003/0209359 A1 * | 11/2003 | Baker | 174/65 G |

FOREIGN PATENT DOCUMENTS

| | | |
|---|---|---|
| EP | 0 580 130 A1 * | 1/1994 |
| FR | 2 856 203 | 12/2004 |
| FR | 2856203 A1 * | 12/2004 |

* cited by examiner

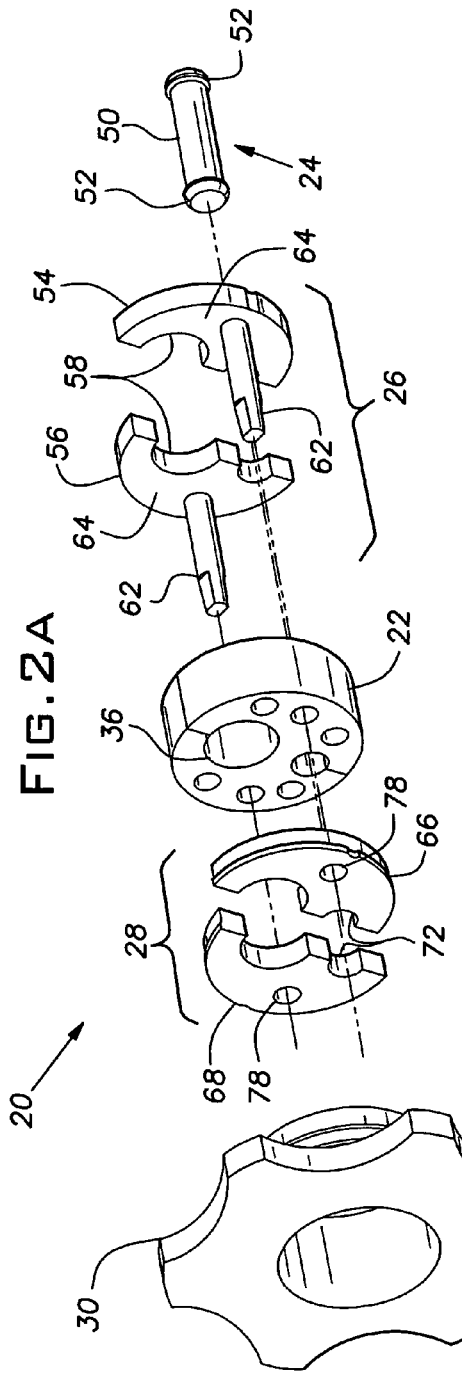
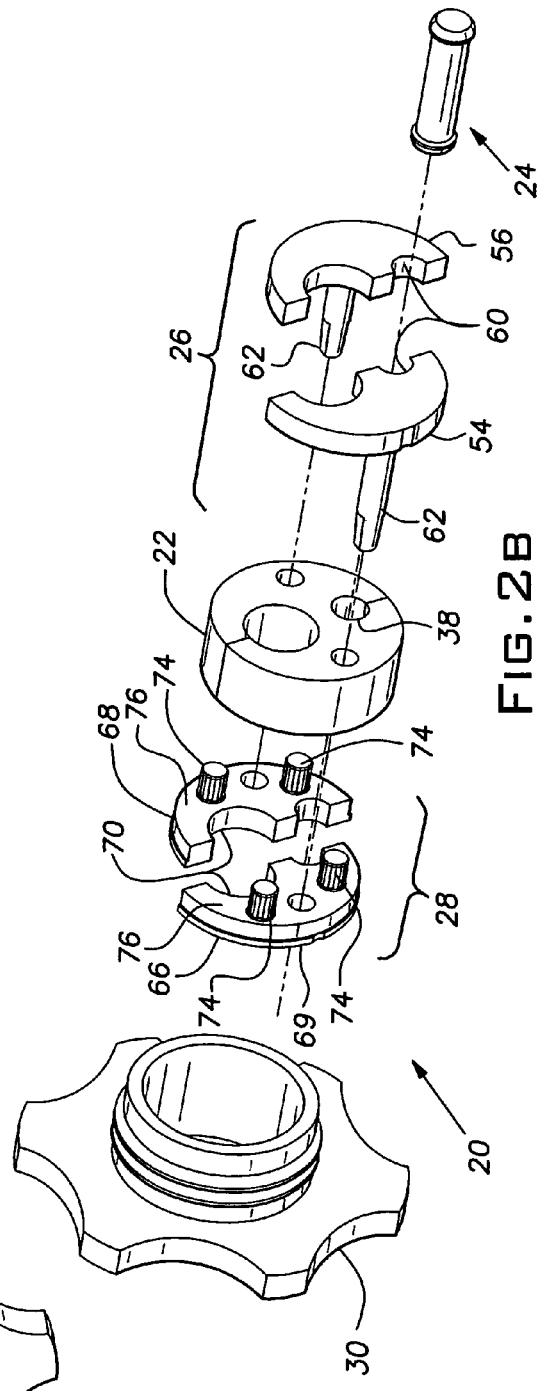

CORD SEAL FOR SWIMMING POOL AND SPA LIGHT NICHES

CROSS-REFERENCE TO RELATED APPLICATIONS

Benefit of U.S. Provisional Patent Application Ser. No. 60/730,636, filed Oct. 27, 2005, is hereby claimed and the disclosure incorporated herein by reference.

FIELD OF THE INVENTION

The present invention relates to a pool and spa underwater light niche. More specifically, the present invention relates to a cord seal for an underwater light to prevent water from entering the electrical conduit.

BACKGROUND OF THE INVENTION

Underwater lighting has generally been employed in pools, spas and the like to enhance the attractiveness and safety of the water. The underwater light is typically installed in either a wet or dry niche located in the pool wall. In wet niche applications, where water resides inside the niche, it is desirable to prevent water from entering the electrical conduit, which carries the power cord and grounding cord for the light. If the conduit is not sealed off from the pool water, chemically active water resides in the conduit, thus, creating a risk of corrosion. Further, any damage to the underground conduit will cause a pool leak that is difficult to locate. The threat of a pool leak that cannot be located causes many builders to specify a more costly metal conduit rather than the plastic conduit. One solution to prevent water from entering the electrical conduit is to inject a silicone sealant into the conduit and around the power and ground cord. The silicone sealant, however, may or may not provide an adequate seal. Further, the injection of the silicone sealant makes it difficult to replace the light because the silicone glues the power and ground cords into the conduit.

Thus, what is desired is a seal that overcomes that solves the problems discussed above, including making it easier to replace a light and accommodating a power and a ground cord of different dimensions. The present invention overcomes these problems by providing a deformable seal having a split design. The split design allows the seal to be installed after the power and ground cords are installed. Further, the present invention can accommodate two cords of different diameters. The present invention can be installed before a pool is filled with water. Passage of water into the conduit will be prevented by the present invention.

BRIEF SUMMARY OF THE INVENTION

A cord seal for use in an underwater niche comprises a seal cap and a main seal having a front side and a rear side and the main seal further includes a plurality of passages that are accessible from the front side and the rear side. The main seal also includes at least one split where the main seal is deformable to provide a water-tight seal.

BRIEF DESCRIPTION OF THE DRAWINGS

The invention may take physical form in certain parts and arrangement of parts, a preferred embodiment of which will be described in detail in this specification and illustrated in the accompanying drawings that form a part of the specification.

FIGS. 2A and 2B are exploded views of the present invention shown in opposite directions.

DETAILED DESCRIPTION OF THE INVENTION

Figure 1A:
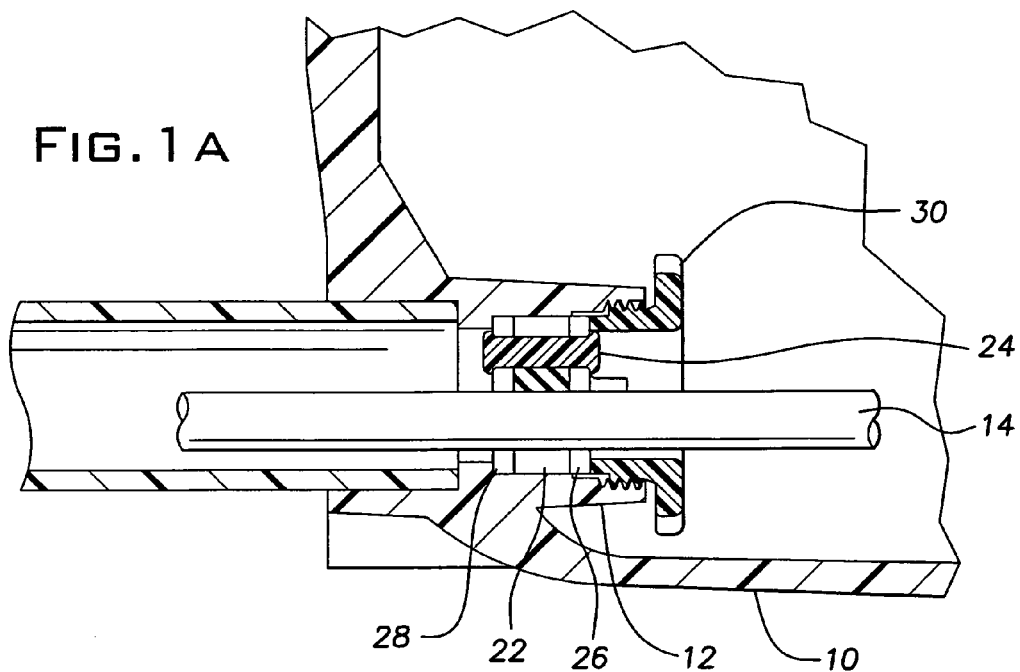
FIG. 1A is a partial side view of an underwater niche showing the present invention installed with one wire.

The present invention is a cord seal device that contains a split seal device. The present invention can also contain additional supporting pieces to aid in forming the seal. The support pieces may be placed above and below the main seal. Each of these supporting pieces can be made in halves. The support pieces are attached to a main seal by having a plurality of projections that connect with apertures and cavities in the main seal. The assembly can then be pried open along at least one split in the main seal for installation and removal of either a lamp cord and a grounding or bonding wire. The lamp cord and the grounding wire fit into passages in the main seal. The split in the main seal allows easier assembly of the underwater light assembly and allows for the elimination of the use of any sealant. The main seal acts as a spring by deforming in response to a force applied to the cord seal, such as by a seal cap. The seal cap forces the material of the main seal, such as rubber, to fill the gaps around the lamp cord and the grounding wire and also fills any other small gaps between the main seal in a niche. The deformation of the main seal results in a water-tight seal around the lamp cord passage and a grounding wire passage so that the split does not affect the seal of the device.

It is to be appreciated that the cord seal 20 in one embodiment may contain only a seal cap 30 and a main seal 22 as long as the seal cap 30 is tightened by a plurality of screws. In another embodiment, the seal cap 30 tightens by rotating on a thread and the cord seal 20 may contain at least one additional support pieces. In another alternative embodiment, the additional support pieces may be comprised of a front seal support 26 and/or a rear seal support 28 to allow free rotation of the seal cap 30 without tearing the soft rubber seal and the support pieces are composed of a harder material than the main seal. An embodiment containing both the front seal support 26 and the rear seal support 28 is shown in FIGS. 2A, 2B, 3A, 3B, 4A, and 4B. In the embodiment where the seal cap 30 has threads, these threads mate with the threads of the hub 12, as shown in FIGS. 1A and 1B.

Figure 1B:
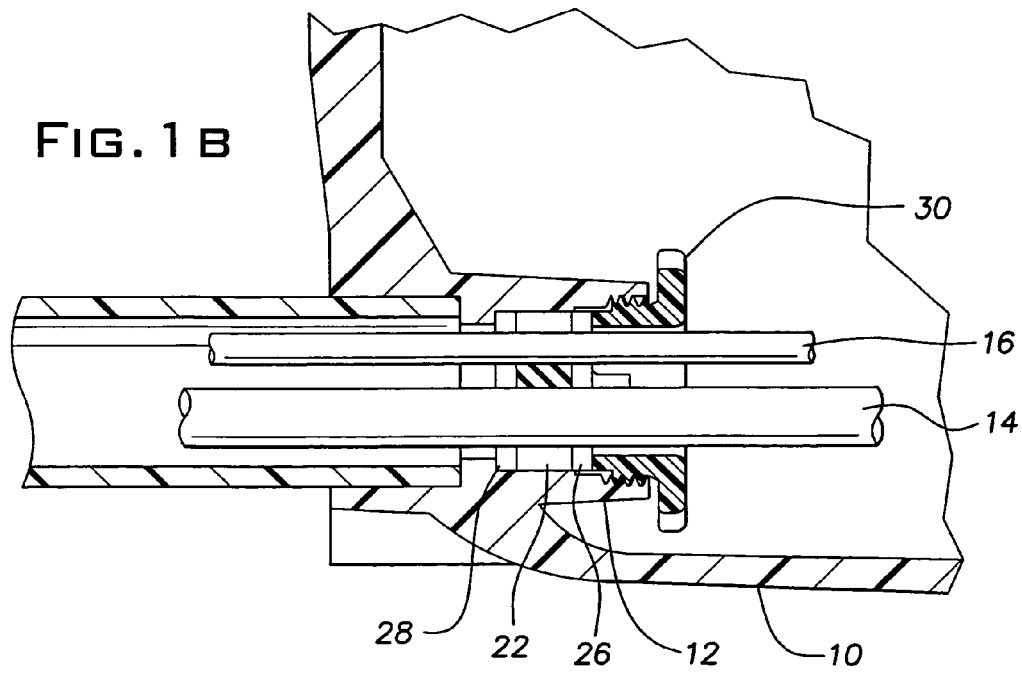
FIG. 1B is a partial side view of an underwater niche showing the present invention installed with two wires.

Referring now to the drawings, FIGS. 1A and 1B show the different installation configurations of a cord seal 20 in accordance with the present invention. For example, FIG. 1A shows a single wire installation and FIG. 1B shows a two-wire installation. More specifically, FIG. 1A shows a partial cross-sectional side view of an underwater niche 10 showing the cord seal 20 comprising a main seal 22, front seal support 26, a rear seal support 28, and a seal cap 30. The cord seal 20 is installed in a hub 12 with a lamp cord 14 and a cylindrical seal 24. FIG. 1B shows the same underwater niche 10 with the cord seal 20 installed in the hub 12 with the lamp cord 14 and a grounding wire 16 instead of a cylindrical seal 24.

FIGS. 2A and 2B show exploded views of the cord seal 20. In this embodiment, the cord seal 20 includes a main seal 22, a cylindrical seal 24, a front seal support 26, a rear seal support 28, and a seal cap 30. The cylindrical seal 24 that is used in place of the grounding wire 16 in single wire applications may include a seal body 50 and a stop portion 52 located at each end of the seal body 50. Each stop portion 52 has a diameter larger than the seal body 50. When the cylindrical seal 24 is installed, one stop portion 52 contacts a front side of the front seal support 26 and the other stop portion 52 contacts a back side of the rear seal support 28. Therefore, when installed, the stop portion 52 prevents the cylindrical seal 24 from sliding and becoming dislodged from the main seal 22. It is to be appreciated that additional supporting pieces may be included with the cord seal 20 and that the seal body 50 would have a larger length to accommodate the additional structures. One stop portion 52 would contact a front side of a supporting piece that is the greatest distance from the seal cap 30 and the other stop portion would contact a back side of a supporting piece that is closest to the seal cap 30.

In the embodiment shown in FIGS. 2A and 2B, the front seal support 26 is comprised of two halves, a front left half 54 and a front right half 56. Each half 54, 56 includes two semi-circles 58, 60. The first semi-circle 58 has approximately the same radius as a cord receiving passage 36 located on the main seal 22 and the second semi-circle 60 has approximately the same radius as a wire receiving passage 38 on the main seal 22. When the cord seal 20 is installed in the underwater niche 10, the first semi-circle 58 from each half 54, 56 forms an aperture that has the same diametric center as the cord receiving passage 36 to receive the lamp cord 14. The second semi-circle 60 from each half 54, 56 forms a circumference that has the same diametric center as the wire receiving passage 38 thereby receiving either the cylindrical seal 24 or the grounding wire 16. It is to be appreciated that the exploded views presented in FIGS. 2A and 2B may include a grounding wire 16 instead of a cylindrical seal 24.

A plurality of fastening projections 62 extend substantially perpendicular from a rear side 64 of each half 54, 56 of the front seal support 26. When the cord seal 20 is installed in the underwater niche 10 each fastening projection 62 penetrates one of a plurality of fastening apertures 40 on the main seal 22 thereby securing the front seal support 26 to the main seal 22. The location of the fastening apertures 40 in one embodiment is shown in FIGS. 4A and 4B and will be described more specifically further below.

The rear seal support 28 is also comprised of two halves in this embodiment, a rear left half 66 and a rear right half 68. Each half 66, 68 includes a flange portion 69 that has a radius slightly larger than each half 66, 68. This flange portion 69 provides a stop against an inner portion of the hub 12 when the cord seal 10 is installed so as to prevent over tightening. Each half 66, 68 further includes two semi-circles 70, 72. The first semi-circle 70 has approximately the same radius as the cord receiving passage 36 and the second semi-circle 72 has approximately the same radius as the wire receiving passage 38 on the main seal 22. When the cord seal 20 is installed in the underwater niche 10 the first semi-circle 70 from each half 66, 68 forms a passage that has the same circumference as the cord receiving passage 36 thereby receiving the lamp cord 14. The second semi-circle 72 from each half 66, 68 forms a passage that has the same circumference as the wire receiving passage 38 thereby receiving either the cylindrical seal 24 or the grounding wire 16. At least one fastening stub 74 extends substantially perpendicular from a front side 76 of each half 66, 68. When the cord seal 20 is installed the fastening stubs 74 penetrate a plurality of cavities 48 on the main seal 22 to thereby secure the rear seal support 28 to the main seal 22. The location of the cavities 48 in one embodiment is shown in FIGS. 4A and 4B and will be described more specifically further below. Each half 66, 68 further includes an alignment aperture 78. The alignment apertures 78 have the same diametric center as the fastening apertures 40. Thus, when the cord seal 20 is installed, the fastening projections 62 from the front seal support 26 penetrate the alignment apertures 78 to thereby align the rear seal support halves 66, 68 to the main seal 22.

Figures 3A, 3B:
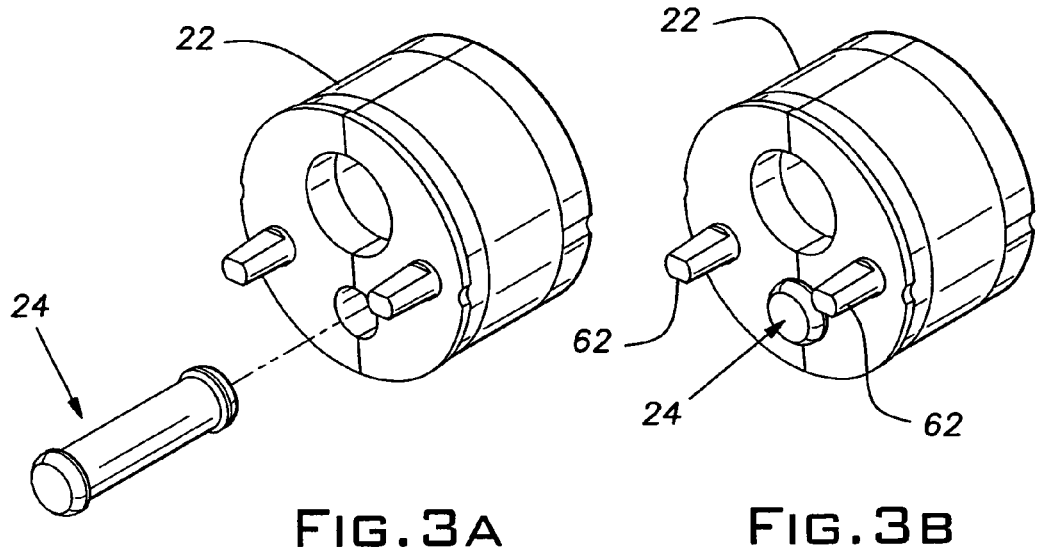
FIGS. 3A and 3B are an assembled perspective view of the present invention with a cylindrical seal exploded and inserted respectively.

Referring to FIGS. 3A and 3B, an embodiment of a fully assembled cord seal is shown using a cylindrical seal 24. The fastening projections 62 extend through the main seal 22 and extend into and out of the rear seal support. The portion extending out the back of the rear seal support 28 allows the lamp cord 14 to be easily installed and removed with an extraction tool such as pliers. The user can spread apart the main seal 22 by using an extraction tool to grasp the fastening projections 62. Providing a front seal support 26 with two halves 54, 56 and a rear seal support 28 with two halves 66, 68 allows for the support pieces to also spread apart. Furthermore, the fastening projections 62 aid in holding the cord seal together as one structure.

Figures 4A, 4B:
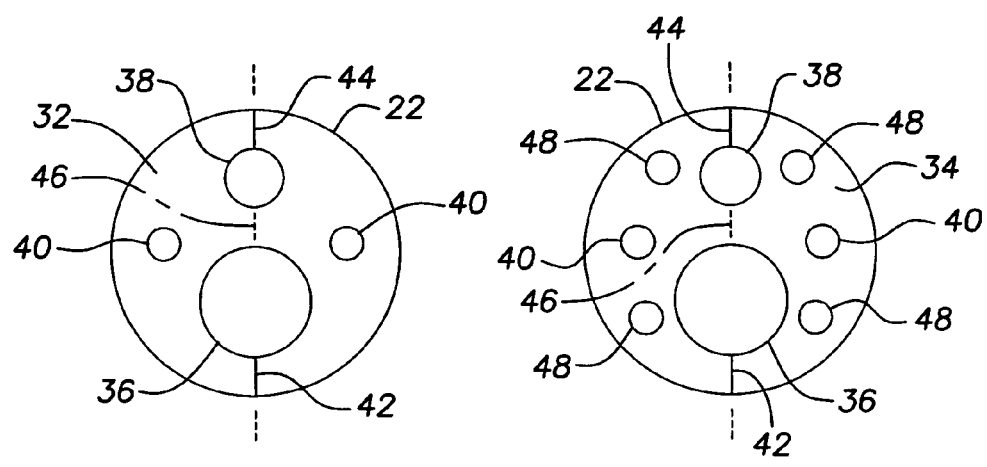
FIGS. 4A and 4B are front and rear views respectively of a main seal.

Referring to FIGS. 4A and 4B, the main seal 22 can be made of any type of sealing material known in the art such as rubber. In the embodiment shown, the main seal 22 is made from a deformable rubber and more specifically from EPDM. The main seal 22 is circular in shape and has an overall diameter and thickness to fit a standard sized hub 12 for an underwater niche 10 in a pool, spa, and the like. The main seal 22 has a front 32 and a rear 34 side and includes a plurality of passages 36, 38 and a plurality of apertures 40 which are accessible from the front side 32 and the rear side 34. The multiple passages include a cord receiving passage 36 and a wire receiving passage 38. The multiple apertures include at least two fastening apertures 40. The main seal 22 further includes a plurality of cavities 48 located on the rear side 34, as seen in FIG. 4B. The multiple cavities 48 receive a plurality of fastening stubs 74 extending from the rear seal support 28. The cord receiving passage 36 receives the lamp cord 14 as shown in FIGS. 1A and 1B.

The main seal 22 is a one piece design. In order for the cord receiving passage 36 to receive the lamp cord 14, the main seal 22 includes a first split 42. The first split 42 is accessible from the front side 32 and the rear side 34 of the main seal 22 and from the cord receiving passage 36 to the outer circumferential edge of the main seal 22. Thus, the lamp cord 14 is inserted into the cord receiving passage 36 by simply spreading the main seal 22 at the location of the first split 42. When the cord seal 20 is installed, the tightening of the seal cap 30 causes the main seal to deform thereby causing both sides of the first split 42 to tightly compress against each other, thus, forming a seal. The tightening of the seal cap 30 deforms the rubber to fill the gap around the wires and any other small gaps between the rubber and cavity walls or other components. Therefore, even though the cord seal 20 has a split design the deformity of the main seal 22 prevents water from flowing into the electrical conduit through the first split 42.

The wire receiving passage 38 receives a cylindrical object, and can have one of two functions depending on the application. The wire receiving passage 38 receives the cylindrical seal 24 in a single wire application as shown in FIG. 1A and receives the grounding wire 16 in a two-wire application as shown in FIG. 1B. In order for the wire receiving passage 38 to receive either the cylindrical seal 24 or the grounding wire 16, the main seal 22 includes a second split 44 diametrically opposite from the first split 42. The second split 44 is accessible from the front side 32 and the rear side 34 of the main seal 22 and from the wire receiving passage 38 to the outer circumferential edge of the main seal 22. Thus, the cylindrical seal 24 or the grounding wire 16 is inserted into the wire receiving passage 38 by simply spreading the main seal 22 at the location of the second split 44. In typical applications, the grounding wire 16 is a #8 bonding wire. When the cord seal 20 is installed, the tightening of the seal cap 30 causes the main seal 22 to deform thereby causing both sides of the second split 44 to tightly compress against each other, thus, forming a seal. Therefore, even though the cord seal 20 has a split design the deformity of the main seal 22 prevents water from flowing into the electrical conduit through the second split 44.

Regarding the two fastening apertures 40, the apertures are equal in diameter and are located on opposite sides of an axis 46 formed by the first 42 and second 44 splits. Each fastening aperture 40 receives a fastening projection 62 extending from the front seal support 26, as seen in FIGS. 2A and 2B. The number of fastening apertures 40 can be any number as long as there is at least one fastening aperture 40 on each side of the axis 46. In the embodiment shown, the number of fastening apertures 40 is four.

As previously mentioned, the main seal 22 includes multiple cavities 48 located on the rear side 34 of the main seal 22. Each cavity 48 receives a fastening stub 74 extending from the rear seal support 28, as seen in FIGS. 2A and 2B. The number of cavities 48 can be any number as long as there is at least one cavity 48 on each side of the axis 46. In the embodiment shown, the number of cavities 48 is four, two on either side of the axis 46.

The different embodiments of the described cord seal can be used in a niche assembly. A niche in a wall can house a lighting structure, where the lighting structure is connected by an electrical conduit to a power source located on the exterior of the niche. The main seal is connected between the lighting structure and the electrical conduit to prevent water from entering the electrical conduit and the exterior of the niche. The seal cap is placed in physical contact with one side of the main seal. A cord is then routed through the exterior of the niche in the electrical conduit, through the main seal, and into the interior of the niche wherein the cord is routed through the main seal by spreading apart the main seal at the location of a first split in the main seal. The main seal is deformable in response to the physical contact of the seal to provide a water-tight seal.

Referring to FIGS. 1A and 1B, to install the cord seal 20, the lamp cord 14 and the grounding wire 16 will be routed into the inside of the niche 10 through the seal cap 30 and into the conduit. The required length of the lamp cord 14 is pulled into the niche 10. The grounding wire 16 is pulled through the niche 10 with enough slack to connect to a bonding lug (not shown). The main seal 22 is grasped. The main seal 22 should be spread apart at the location of the first split 42 to allow for passage of the lamp cord 14 at the cord receiving passage 36. The main seal 22 should be spread apart at the location of the second split 44 to allow for passage of the grounding wire 16 at the wire receiving passage 38. In an alternative embodiment, the main seal 22 can be spread apart by the aid of pulling apart the fastening projections 62 from the front seal support 26. The orientation of the main seal, in this embodiment, is such that if a front seal support 26 is used, the fastening projections 62 from the front seal support 26 will be oriented towards the seal cap 30. Once the user ensures that the sealing surface is clean and clear of any debris and the lamp cord and the other cylindrical object is inserted, the cord seal 20 should be slid down the wires and inserted into the threaded hub 12 in the niche 10. The cord seal 20 should be inserted into the niche 10 until it cannot travel any farther. The seal cap 30 should then be partially connected to the cord seal 20. For example, the seal cap 30 can be turned clockwise two or three turns to facilitate a partial connection. The end of the grounding wire 16 extending out of the cord seal 20 should be connected to a lug (not shown) inside the niche 10. A screw is used to secure the grounding wire 16 to the lug, but the user must ensure that the wire has sufficient slack to allow for removal of the seal cap 30 and the cord seal 20 in the future. Due to the seal cap 30 only being partially connected, the length of the lamp cord 14 and the grounding wire 16 should still be adjustable by gently tugging on either wire. The connection between the grounding wire and the lug should be sealed, such as by the use of a 3M Scotchcast 2135 sealant. After the user has determined the desired length of the lamp cord and the grounding wire, the seal cap 30 should be connected fully, or in one embodiment turned clockwise as much as possible. The turning of the seal cap 30 will secure and lock the cord seal 20, and the lengths of the lamp cord and the grounding wire will no longer be adjustable. The user can then tug on the lamp cord and the grounding wire to ensure that they do not move. The cord seal 20 will form a water-tight seal so that water cannot enter the conduit from inside of the niche.

Alternatively, if a grounding wire 16 is not being used, the cylindrical seal 24 should be inserted into the wire receiving passage 38. Furthermore, there will be no steps for installing that involve the grounding lug.

To remove the cord seal 20 and replace it, the light assembly should be removed from the niche 10 and the wire that is connected to the existing light, the lamp cord 14, should be cut. The seal cap 30 should be unscrewed form the hub 12 in the niche. The lamp cord 14 should then be pulled slightly to loosen the cord seal 20 from the threaded hub 12. Using pliers or another extraction tool, each of the fastening projections 62 should be gently pulled to spread apart the main seal 22 to provide access for removing the lamp cord 14. The grounding wire 16 and the lamp cord 14 should then be removed from the main seal 22. The main seal 22 should then be removed from any supporting pieces and removed from the niche 10. The grounding wire should still be connected to the lug inside the niche. Alternatively, a cylindrical seal 24 would only need to be removed from the main seal 22, as opposed to a grounding wire 16.

To begin replacing the cord seal 20, a new lamp cord 14 should be inserted through the seal cap 30. The new main seal 22 should be attached to any supporting pieces and should be spread apart at the first split 42 for insertion of the lamp cord 14. The second split 44 of the main seal 22 should be spread apart for insertion of the grounding wire 16 or the cylindrical seal 24. Once the user ensures that the sealing surface is clean and clear of any debris, the cord seal 20 should be slid down the wires and inserted into the threaded hub 12 in the niche 10. The cord seal 20 should be inserted into the niche 10 until it cannot travel any farther. The seal cap 30 should then be partially connected to the cord seal 20. For example, the seal cap 30 can be turned clockwise two or three turns to facilitate a partial connection. The length of the lamp cord 14 should still be adjustable by gently tugging on the lamp cord 14. After the user has determined the desired length of the lamp cord 14, the seal cap 30 should be connected fully, or in one embodiment turned clockwise as much as possible. The turning of the seal cap 30 will secure and lock the cord seal 20, and the length of the lamp cord will no longer be adjustable. The user can then tug on the lamp cord 14 to ensure that it does not move. The grounding wire 16 should still be connected to a lug (not shown) inside the niche 10. The cord seal 20 will form a water-tight seal so that water cannot enter the conduit from inside the niche.

While specific embodiments of the invention have been described and illustrated, it is to be understood that these embodiments are provided by way of example only and that the invention is not to be construed as being limited thereto.

What is claimed is:

1. A cord seal for use in an underwater niche comprising:
   a main seal that includes a plurality of passages that are accessible from one side of the main seal and an opposite side of the main seal;
   wherein the main seal includes a first split and a second split;
   a seal cap placed in physical contact with the opposite side of the main seal; and
   wherein the main seal is deformable in response to the physical contact of the seal cap to provide a water-tight seal;
   wherein the first split spans from the one side of the main seal to the opposite side of the main seal and the first split begins at an edge of one of the plurality of passages and ends at an outer circumferential edge of the main seal;
   wherein the second split spans from the one side of the main seal to the opposite side of the main seal and the second split begins at an edge of another one of the plurality of passages and ends at a second outer circumferential edge of the main seal; and
   a cylindrical seal inserted into one of the plurality of passages;
   wherein the cylindrical seal comprises a seal body and a stop portion located at each end of the seal body;
   wherein the stop portion has a larger diameter than the seal body.

2. A cord seal for use in an underwater niche according to claim 1, wherein: the stop portion on one end of the seal body contacts one side of the front seal support and the other stop portion on the other end of the seal body contacts one side of the rear seal support.

3. A cord seal for use in an underwater niche according to claim 1, further comprising a grounding wire inserted into one of the plurality of passages.

4. A cord seal for use in an underwater niche according to claim 1, further comprises one support piece placed above or below the main seal.

5. A cord seal for use in an underwater niche according to claim 1, wherein the main seal is circular in shape and has an overall diameter and thickness to fit a standard sized hub for an underwater niche in a pool.

6. A cord seal for use in an underwater niche according to claim 1, wherein the main seal is made from a deformable rubber.

7. A cord seal for use in an underwater niche comprising:
   a main seal that includes a plurality of passages that are accessible from one side of the main seal and an opposite side of the main seal;
   wherein the main seal includes one split;
   a seal cap placed in physical contact with the opposite side of the main seal;
   wherein the main seal is deformable in response to the physical contact of the seal cap to provide a water-tight seal; and
   one support piece placed above or below the main seal;
   wherein the one split spans from the one side of the main seal to the opposite side of the main seal and the one split begins at an edge of one of the plurality of passages and ends at an outer circumferential edge of the main seal;
   wherein the main seal further comprises a second split that spans from the one side of the main seal to the opposite side of the main seal and the second split begins at an edge of another one of the plurality of passages and ends at an outer circumferential edge of the main seal;
   one support piece placed above or below the main seal;
   wherein the one support piece is a front seal support comprised of two halves, each half includes one semi-circle to correspond to the circumference of one of the plurality of passages and another semi-circle to correspond to the circumference of another one of the plurality of passages;
   wherein each half has at least one projection extending out from one side of the front seal support to the main seal for connecting the front seal support to the main seal; and
   wherein the main seal further comprises a plurality of apertures that are accessible from one side of the main seal and an opposite side of the main seal to receive each projection from the front seal support.

8. A cord seal for use in an underwater niche according to claim 7:
   further comprising a second support piece that is a rear seal support;
   wherein the rear seal support is comprised of two halves, each half includes one semi-circle to correspond to the circumference of one of the plurality of passages and another semi-circle to correspond to the circumference of another one of the plurality of passages;
   wherein each half has at least one stub extending out from one side of the rear seal support for connecting the front seal support to the main seal;
   wherein each half of the rear seal support includes a plurality of apertures to receive the projections from the front seal support;
   wherein the plurality of apertures of the rear seal support are accessible from one side of the rear seal support and an opposite side of the rear seal support to receive each projection from the front seal support; and
   wherein the main seal further comprises at least one cavity located on one side of the main seal to receive each stub from the rear seal support.

9. A cord seal for use in an underwater niche according to claim 8, wherein:
   each half of the rear seal support includes a flange portion that has a radius slightly larger than each half of the rear seal support to prevent over tightening by providing a stop against an inner portion of the seal cap.

10. A niche assembly comprising:
    a niche in a wall that houses a lighting structure;
    wherein the lighting structure is connected by an electrical conduit to a power source located on the exterior of the niche;
    a main seal located between the lighting structure and the electrical conduit to prevent water from entering the electrical conduit and the exterior of the niche;
    wherein the main seal includes a plurality of passages that are accessible from one side of the main seal and an opposite side of the main seal;
    wherein the main seal includes one split;
    a seal cap is placed in physical contact with the opposite side of the main seal;
    a cord routed though the exterior of the niche in the electrical conduit, through the main seal, and into the interior of the niche;
    wherein the cord is routed through the main seal by spreading apart the main seal at the location of a first split in the main seal;

wherein the main seal is deformable in response to the physical contact of the seal cap to provide a water-tight seal;

wherein the one split spans from the one side of the main seal to the opposite side of the main seal and the one split begins at an edge of one of the plurality of passages and ends at an outer circumferential edge of the main seal; and wherein the main seal further comprises a second split that spans from the one side of the main seal to the opposite side of the main seal and the second split begins at an edge of another one of the plurality of passages and ends at an outer circumferential edge of the main seal;

one support piece placed above or below the main seal;

wherein the one support piece is a front seal support comprised of two halves, each half includes one semi-circle to correspond to the circumference of one of the plurality of passages and another semi-circle to correspond to the circumference of another one of the plurality of passages;

wherein each half has at least one projection extending out from one side of the front seal support to the main seal for connecting the front seal support to the main seal; and wherein the main seal further comprises a plurality of apertures that are accessible from one side of the main seal and an opposite side of the main seal to receive each projection from the front seal support.

11. A niche assembly according to claim 10, further comprising a second support piece that is a rear seal support;

wherein the rear seal support is comprised of two halves, each half includes one semi-circle to correspond to the circumference of one of the plurality of passages and another semi-circle to correspond to the circumference of another one of the plurality of passages;

wherein each half has at least one stub extending out from one side of the rear seal support for connecting the front seal support to the main seal;

wherein each half of the rear seal support includes a plurality of apertures to receive the projections from the front seal support;

wherein the plurality of apertures of the rear seal support are accessible from one side of the rear seal support and an opposite side of the rear seal support to receive each projection from the front seal support; and wherein the main seal further comprises at least one cavity located on one side of the main seal to receive each stub from the rear seal support.

12. A niche assembly according to claim 11, wherein: each half of the rear seal support includes a flange portion that has a radius slightly larger than each half of the rear seal support to prevent over tightening by providing a stop against an inner portion of the seal cap.

13. A niche assembly according to claim 10, further comprising:

a cylindrical seal inserted into one of the plurality of passages;

wherein the cylindrical seal comprises a seal body and a stop portion located at each end of the seal body; and wherein the stop portion has a larger diameter than the seal body.

14. A niche assembly according to claim 13, wherein:
the stop portion on one end of the seal body contacts one side of the front seal support and the other stop portion on the other end of the seal body contacts one side of the rear seal support.

15. A niche assembly according to claim 10 wherein:
a grounding wire is inserted into one of the plurality of passages and the grounding wire is connected to a bonding lug in the interior of the niche.

16. A niche assembly according to claim 15 wherein:
the grounding wire connects to the bonding lug in the interior of the niche by the use of a sealant.

17. A niche assembly according to claim 10:
wherein the main seal is circular in shape and has an overall diameter and thickness to fit a standard sized hub for an underwater niche in a pool.

18. A niche assembly according to claim 10:
wherein the main seal is made from a deformable rubber.

19. A method for installing a cord seal in an underwater niche, the method comprising:

routing a cord inside a niche through a seal cap and an electrical conduit;

pulling the required length of the cord through the niche;

inserting a cord into a passage of a main seal by spreading apart the main seal at the location of a first split in the main seal;

sliding a cord seal containing the main seal down into the niche and inserting the cord seal into a threaded hub in the niche; and connecting a seal cap to the main seal.

20. A method for installing a cord seal in an underwater niche in accordance with claim 19, further comprising the step of inserting a cylindrical seal into a second passage of the main seal by spreading apart the main seal at the location of a second split in the main seal.

21. A method for installing a cord seal in an underwater niche in accordance with claim 19, further comprising:

inserting a grounding wire into a second passage of the main seal by spreading apart the main seal at the location of a second split in the main seal;

pulling the grounding wire through the niche but leaving enough slack to connect the grounding wire to a bonding lug; and connecting the grounding wire to the bonding lug inside the niche by the use of a sealant.

22. A method for removing an installed cord seal in an underwater niche comprising:

removing a light assembly from the niche;

cutting a cord that is connected to an existing light;

unscrewing a seal cap from the niche;

pulling the cord to loosen a cord seal from the niche;

using an extraction tool to pull on a plurality of fastening projections connected to a main seal to spread apart the main seal to provide access for removing a cord; and removing the main seal from the cord and from the niche.

23. A method for removing an installed cord seal in an underwater niche according to claim 22, further comprising the step of removing a grounding wire from a passage in the main seal.

24. A method for removing an installed cord seal in an underwater niche according to claim 22, further comprising the steps of removing a cylindrical seal from a wire receiving passage in the main seal.

* * * * *